United States Patent
Hata et al.

(10) Patent No.: US 8,074,621 B2
(45) Date of Patent: Dec. 13, 2011

(54) IN-CYLINDER INJECTION TYPE INTERNAL COMBUSTION ENGINE

(75) Inventors: Koji Hata, Okazaki (JP); Dai Tanaka, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 333 days.

(21) Appl. No.: 12/528,342

(22) PCT Filed: Mar. 13, 2008

(86) PCT No.: PCT/JP2008/054576
§ 371 (c)(1),
(2), (4) Date: Aug. 24, 2009

(87) PCT Pub. No.: WO2009/041085
PCT Pub. Date: Apr. 2, 2009

(65) Prior Publication Data
US 2010/0065018 A1    Mar. 18, 2010

(30) Foreign Application Priority Data
Sep. 27, 2007 (JP) ................... 2007-251198

(51) Int. Cl.
*F02B 5/02* (2006.01)
(52) U.S. Cl. ....................... 123/298; 123/305
(58) Field of Classification Search .......... 123/298, 123/305
See application file for complete search history.

(56) References Cited

U.S. PATENT DOCUMENTS

| | | | | |
|---|---|---|---|---|
| 5,908,018 A * | 6/1999 | Suzuki | ............ | 123/301 |
| 5,927,244 A * | 7/1999 | Yamauchi et al. | ............ | 123/295 |
| 5,960,767 A * | 10/1999 | Akimoto et al. | ............ | 123/298 |
| 6,948,474 B2 * | 9/2005 | Yamaguchi et al. | ............ | 123/295 |
| 7,124,735 B2 * | 10/2006 | Kobayashi et al. | ............ | 123/305 |
| 2002/0014219 A1 * | 2/2002 | Suzuki et al. | ............ | 123/305 |
| 2002/0050267 A1 * | 5/2002 | Okamoto et al. | ............ | 123/305 |
| 2002/0073958 A1 * | 6/2002 | Wright | ............ | 123/305 |
| 2003/0051702 A1 * | 3/2003 | Baika et al. | ............ | 123/298 |
| 2003/0056748 A1 * | 3/2003 | Yu | ............ | 123/262 |
| 2005/0139191 A1 * | 6/2005 | Tanaka et al. | ............ | 123/302 |
| 2008/0022967 A1 * | 1/2008 | Tanaka et al. | ............ | 123/305 |
| 2010/0012083 A1 * | 1/2010 | Tanaka et al. | ............ | 123/305 |

FOREIGN PATENT DOCUMENTS

| | | |
|---|---|---|
| JP | 7-259705 A | 10/1995 |
| JP | 10-54246 A | 2/1998 |
| JP | 2000-45777 A | 2/2000 |
| JP | 3295975 B2 | 6/2002 |

(Continued)

*Primary Examiner* — Erick Solis
(74) *Attorney, Agent, or Firm* — Birch, Stewart, Kolasch & Birch, LLP

(57) ABSTRACT

The invention provides an in-cylinder injection type internal combustion engine that is capable of controlling gas flow velocity in the vicinity of an ignition part of a spark plug and maintaining an air-fuel mixture suitable for ignition for a long time. The engine includes deflecting parts 28 that have a passage 25 located on a wall face of a combustion chamber between an injection part 11 and an ignition part 17, and deflect a portion of the fuel injected from the injection part 11 to indirectly direct the fuel to the vicinity of the ignition part. Due to the above construction, there is a difference in reaching timing between direct and indirect routes, and moreover a flow velocity of gas that reaches the ignition part is reduced by fuel deflection. An air-fuel mixture suitable for ignition therefore remains in the vicinity of the ignition part for a long time.

8 Claims, 5 Drawing Sheets

FOREIGN PATENT DOCUMENTS

| | | |
|---|---|---|
| JP | 2005-30321 A | 2/2005 |
| JP | 2005-188305 A | 7/2005 |
| JP | 2006-291798 A | 10/2006 |
| JP | 2006-291839 A | 10/2006 |
| JP | 2007-92632 A | 4/2007 |
| JP | 2007-231839 A | 9/2007 |

* cited by examiner

IN-CYLINDER INJECTION TYPE INTERNAL COMBUSTION ENGINE

TECHNICAL FIELD

The present invention relates to an in-cylinder injection type internal combustion engine, which produces a stratified air-fuel mixture in a combustion chamber and performs combustion of the mixture.

BACKGROUND ART

Among in-cylinder injection type internal combustion engines that inject fuel directly into combustion chambers to produce an air-fuel mixture, which are so-called direct-injection engines, there are ones that produce a stratified air-fuel mixture in combustion chambers by spray-guide method in order to carry out a lean-burn operation at part load.

These engines that produce a stratified air-fuel mixture, as disclosed for example in Unexamined Japanese Patent Publication No. 10-54246, include an engine that has a combustion chamber provided in its wall with an injection part of a fuel injection valve and an ignition part of a spark plug which are arranged alongside, and injects fuel from the injection part directly to the vicinity of the ignition part of the spark plug to secure an air-fuel mixture area having a theoretical air-fuel ratio suitable for ignition in the vicinity of the spark plug, while putting the whole combustion chamber into an excess-air condition. During part-load operation, lean burn is performed in the combustion chamber, using as a source of ignition a relatively rich air-fuel mixture area that is created near the ignition part of the spark plug.

In order to produce the air-fuel mixture suitable for ignition near the ignition part in the engine that produces the stratified air-fuel mixture, it is required to set the spark plug as close as possible to the injection part of the fuel injection valve but separately enough to prevent a blow-off of electric discharge which is caused by a high gas flow velocity during the fuel injection so that the fuel injected from the fuel injection part of the fuel injection valve may be injected to a target position near the ignition part.

However, since the spark plug is located close to the fuel injection valve, the flow velocity of the fuel injected from the fuel injection valve is high. The air-fuel mixture suitable for ignition therefore remains in the vicinity of the ignition part of the spark plug only for a short time.

Because the ignition has to be completed for this short time, an operation range that enables stable combustion is narrow during the lean-burn operation.

To solve the above problem, a lean burn engine using a spray-guide method has been proposed, in which fuel is caused to strike against an obstacle before the ignition part so that the fuel bounced off the obstacle is fed to the vicinity of the ignition part of the spark plug, for example, as disclosed in Unexamined Japanese Patent Publication No. 2006-291798, instead of feeding the fuel directly to the ignition part of the spark plug as described above.

DISCLOSURE OF THE INVENTION

In the engine that feeds fuel to the ignition part of the spark plug in an indirect manner, the air-fuel mixture remains near the ignition part a little longer due to fuel diffusion caused by collision than in the engine that injects fuel directly to the vicinity of the ignition part.

Nevertheless, the air-fuel mixture suitable for ignition remains near the ignition part of the spark plug only for a short time, and combustion is unlikely to be stable in lean-burn operation as seen in the technology of direct fuel injection.

With any technology, therefore, a range in which combustion is stable, that is, a stable combustion range, is narrow in lean-burn operation.

It is then an object of the present invention to provide an in-cylinder injection type internal combustion engine that is capable of decreasing gas flow velocity in the vicinity of an ignition part of a spark plug and maintaining an air-fuel mixture suitable for ignition for a long time.

In order to achieve the above object, an in-cylinder injection type internal combustion engine of the present invention comprises a fuel injection valve that includes an injection part located in a combustion chamber of the internal combustion engine and injects fuel from the injection part into the combustion chamber; a spark plug that includes an ignition part arranged alongside of the injection part and ignites the fuel injected from the injection part by using the ignition part; and a deflecting part that has a passage for directing the fuel, which is injected from the injection part, directly to the vicinity of the ignition part, the passage being located on a wall face of the combustion chamber between the injection part and the ignition part, and the deflecting part deflecting a portion of the fuel injected from the injection part to indirectly direct the portion of the fuel to the vicinity of the ignition part.

According to the present invention, when fuel is injected from the fuel injection valve during lean-burn operation, an air-fuel mixture suitable for ignition is first produced in the vicinity of the ignition part of the spark plug by the fuel heading directly to the ignition part through the passage. The fuel, which heads indirectly to the ignition part after being deflected at the deflecting part, belatedly reaches the ignition part to keep producing the air-fuel mixture suitable for ignition in the vicinity of the ignition part. Consequently, the air-fuel mixture suitable for ignition can remain in the vicinity of the ignition part for a long time because of a difference in fuel-reaching timing between two different routes, namely, direct and indirect routes. Moreover, a fuel collision caused by deflection decreases the flow velocity of gas that reaches the ignition part. The air-fuel mixture is then stably ignited, which stabilizes lean-burn combustion.

Preferably, the deflecting part is constructed of a pair of protrusions projecting from both sides of the passage into the combustion chamber. It is therefore possible to deflect the fuel with a simple construction.

Preferably, the pair of protrusions includes a pair of side faces opposed to each other and expanding along both sides of the passage, and deflects at the side faces a portion of the fuel injected from the injection part. Due to the pair of side faces opposed to each other, the fuel is easily deflected to the vicinity of the ignition part of the spark plug.

Preferably, the pair of side faces gets closer to each other towards the ignition part, and is arranged so that jets of the fuel collide with each other between the side faces after being deflected and head towards the spark plug. Due to this simple construction in which the deflected fuel jets are caused to collide with each other between wall faces, the fuel advances towards the vicinity of the ignition part while preventing an increase in gas flow velocity which triggers a blow-off of ignition. Accordingly, an air-fuel mixture suitable for ignition can be transported to the vicinity of the ignition part. It is also possible to further delay the timing of when the fuel heading indirectly towards the ignition part reaches the vicinity of the ignition part. Furthermore, since the fuel reaches the vicinity of the ignition part with being diffused, even if a phase of a side electrode of the ignition part varies, depending upon the manner in which the spark plug is installed, it is possible to produce the air-fuel mixture suitable for ignition in a wide range close to a spark position of the ignition part, and to decrease an instability of combustion, attributable to the variation in the phase of the side electrode of the ignition part.

Preferably, the injection part of the fuel injection valve has at least three injection holes. One of the injection holes injects fuel heading directly to the vicinity of the ignition part, and two other injection holes inject fuel heading to the deflecting part. This makes it possible to efficiently keep the air-fuel mixture suitable for ignition remaining in the vicinity of the ignition part by using the multi-hole injection part.

BEST MODE OF CARRYING OUT THE INVENTION

The present invention will be described below with reference to one embodiment shown in FIGS. 1 to 8.

Figure 1:
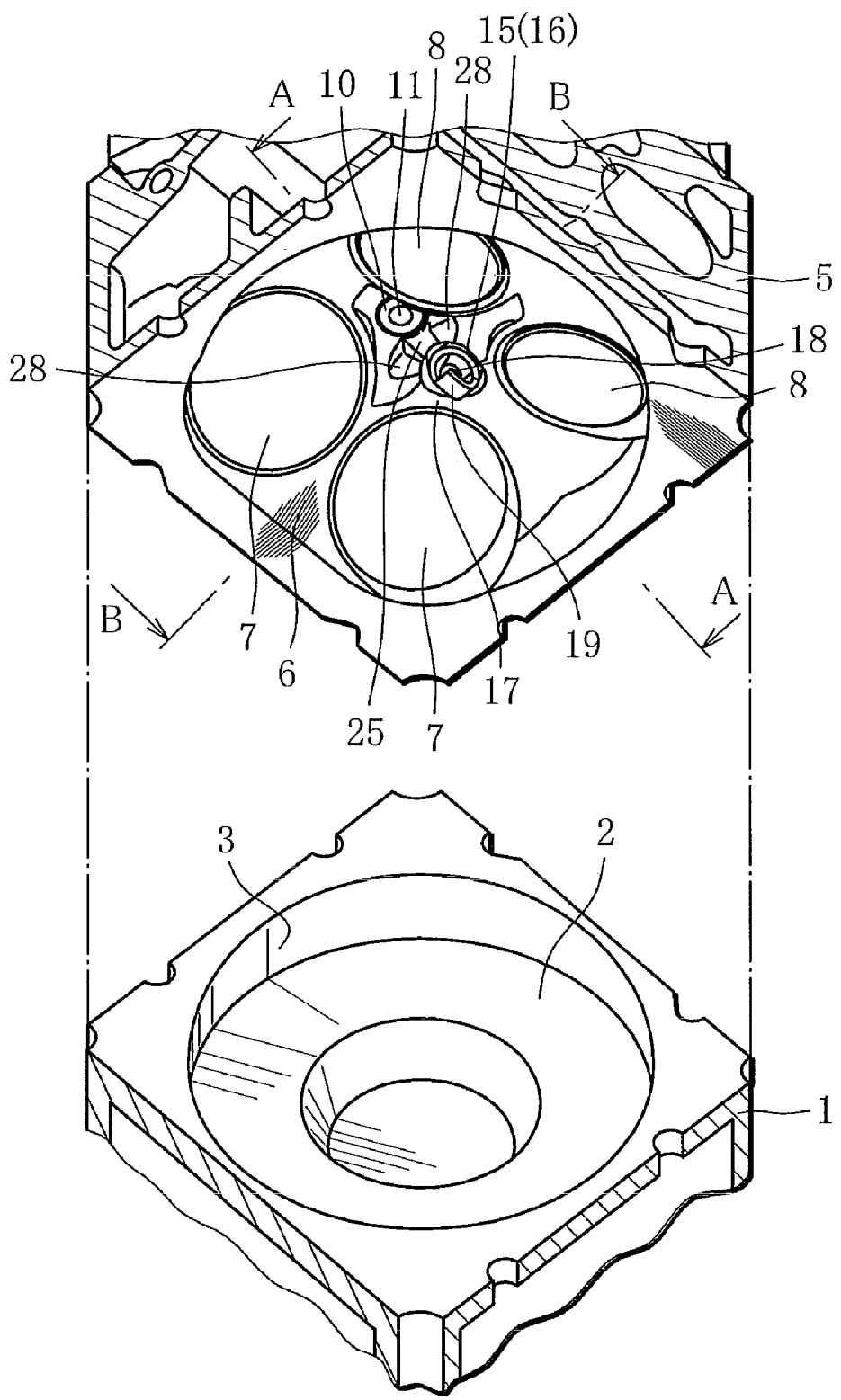
FIG. 1 is a perspective view showing a construction of a combustion chamber of an in-cylinder injection type internal combustion engine according to one embodiment of the present invention.
Figure 2:
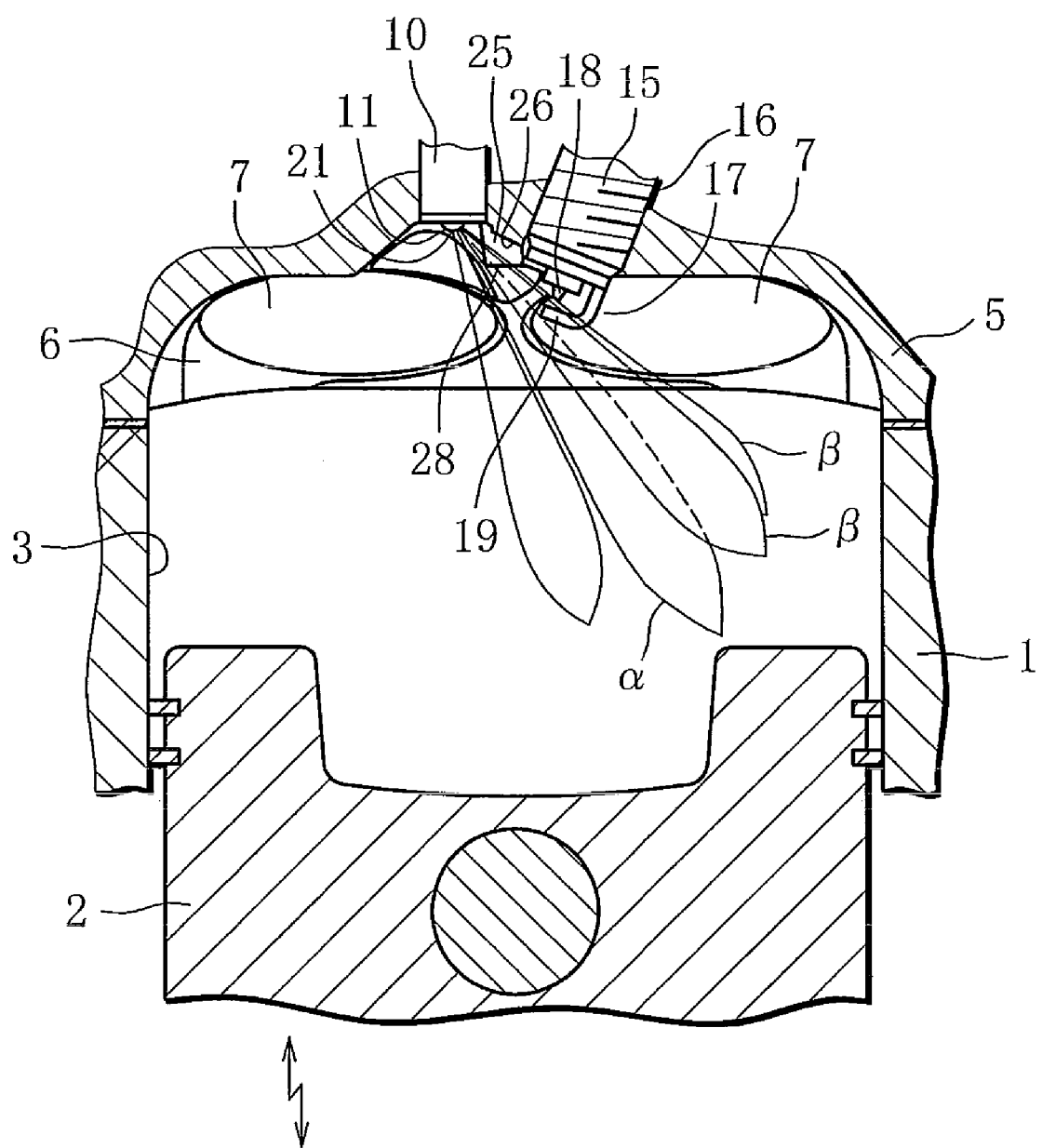
FIG. 2 is a sectional view, taken along line A-A of FIG. 1.
Figure 3:
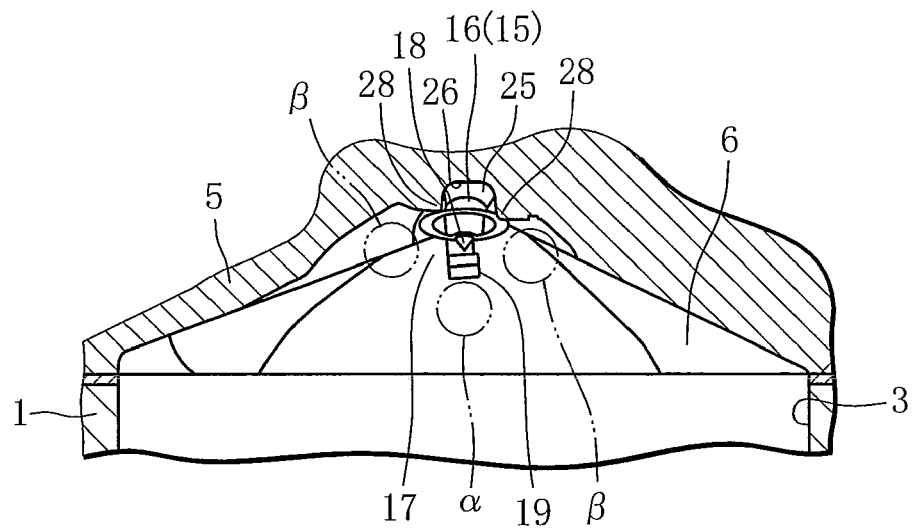
FIG. 3 is a sectional view, taken along line B-B of FIG. 1.

FIG. 1 is a perspective view showing a construction of a combustion chamber in each cylinder of a 4-cycle in-cylinder injection type internal combustion engine that is, for example, a spray-guide direct-injection type gasoline engine (hereinafter, referred to simply as engine). FIG. 2 is a sectional view, taken along line A-A of FIG. 1. FIG. 3 is a sectional view, taken along line B-B of FIG. 1.

Reference numeral 1 in FIGS. 1 to 3 represents a cylinder block forming an engine body. Formed in the cylinder block 1 is a cylinder 3 in which a piston 2 is reciprocably accommodated.

Reference numeral 5 denotes a cylinder head mounted on an upper part of the cylinder block 1. A combustion chamber 6 is defined by a lower surface of the cylinder head 5, which is opposed to the cylinder 3. On both sides of the combustion chamber 6, there are provided a pair of intake valves 7 for controlling intake air introduced through an intake port, not shown, and a pair of exhaust valves 8 for controlling exhaust gas discharged through an exhaust port, not shown. A fuel injection valve 10 is fixed to the center of the combustion chamber 6. The fuel injection valve 10 has a tip end provided with an injection part 11 for injecting fuel. The injection part 11 of the fuel injection valve 10 is protruding into the combustion chamber 6.

In the combustion chamber 6, a spark plug 15 is also fixed alongside of the fuel injection valve 10. The spark plug 15 has a plug body 16 screwed into the cylinder head 1. The spark plug 15 also includes an ignition part 17 in a tip end portion of the plug body 16. The ignition part 17 has a conventional electrode construction, that is, a construction in which a central electrode 18 and an L-shaped side electrode 19 (formed of an arm extending in an axial direction of the central electrode 18 and an arm extending in a direction intersecting with the axial direction of the central electrode 18) are combined together to form a discharge section (spark position) between a tip end of the central electrode 15 and a tip end of the side electrode 19. The ignition part 17 is protruding into the combustion chamber 6 to be located adjacent to the injection part 11.

The injection part 11 injects fuel towards the adjacent ignition part 17 of the spark plug 15. The injection part 11 is constructed by providing the tip end portion of the fuel injection valve 10 with a plurality of injection holes, or more specifically three or more injection holes, and five injection holes 21 in the embodiment, which open toward the spark plug 15.

The ignition part 17 of the spark plug 15 is disposed as close as possible to the injection part 11 but separately enough to prevent a blow-off attributable to a flow velocity of gas produced from the fuel that is injected through the injection holes 21.

In the above-described manner, the 4-cycle engine is constructed, which is capable of performing lean-burn operation that burns a stratified air-fuel mixture. When fuel is injected from the injection part 11 during a compression stroke that is one of four strokes (intake stroke, compression stroke, expansion stroke, and exhaust stroke) that are performed by motions of the piston 2, the opening/closing of the intake valves 7, and the opening/closing of the exhaust valves 8, a stratified air-fuel mixture is produced, in which an air-fuel mixture area at a theoretical air-fuel ratio suitable for ignition is formed near the ignition part 17 of the spark plug 15 while the whole combustion chamber 6 is maintained in an excess-air condition. The engine is accordingly constructed to perform lean-burn operation in which a relatively rich air-fuel mixture produced near the ignition part 17 of the spark plug 15 is used as a source of ignition. When the fuel is injected from the injection part 11 during the intake stroke, the whole combustion chamber 6 is filled with a uniform air-fuel mixture.

Figure 4:
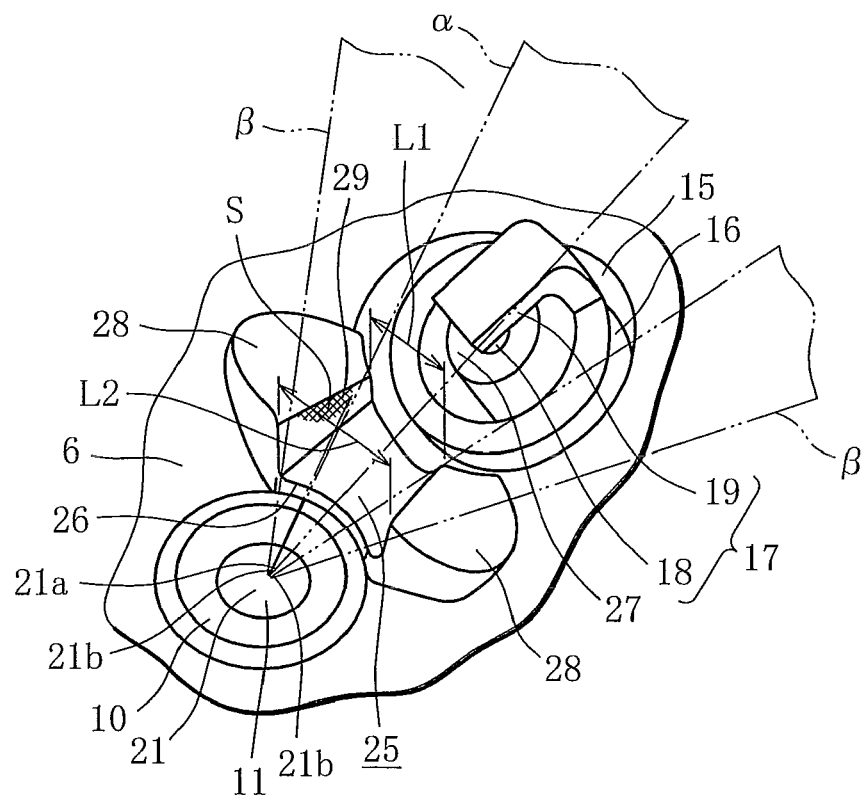
FIG. 4 is a perspective view for explaining a direct route and an indirect route which are formed between an injection part and an ignition part.
Figure 5:
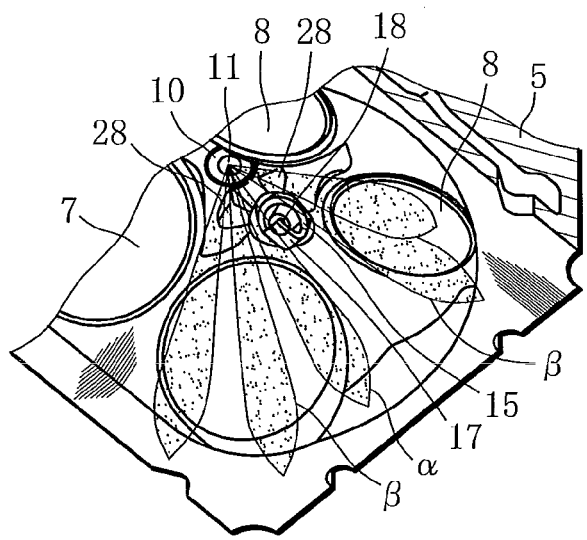
FIG. 5 is a perspective view for explaining the operation of producing a stratified air-fuel mixture within the combustion chamber.

On a wall face of the combustion chamber 6 between the injection part 11 and the ignition part 17, there is a construction that retains the air-fuel mixture suitable for ignition at the ignition part 17 as long as possible. FIG. 4 is a perspective view showing this construction in an enlarged scale.

The construction will be described below. Reference numeral 25 represents a passage that is defined by a pair of protrusions 28 mentioned later between the injection part 11 and the ignition part 17 of the combustion 6. The passage 25 includes a groove-shaped recess 26 that is formed, for example, on the wall face between the injection part 11 and the ignition part 17 and extends straight from the injection part 11 towards the ignition part 17. Between the injection part 11 and the ignition part 17, the passage 25 makes up a direct route 27 that leads a portion of the fuel, which is injected from the injection part 11, directly to the ignition part 17.

On both sides of the passage 25, there is disposed the pair of protrusions 28 (corresponding to a deflecting part of the present invention). The pair of protrusions 28 is formed integrally with the wall face of the combustion chamber 6. Between the injection part 11 and the ignition part 17, the pair of protrusions 28 makes up an indirect route 29 that deflects a portion of the fuel, which is injected from the injection part 11, at the protrusions 28 and thus indirectly leads the portion of the fuel towards the ignition part 17.

By using a difference in route length between the indirect route 29 and the direct route 27, and also by using a change in flow velocity which is caused by the collision between a fuel spray and side faces, the fuel heading indirectly to the ignition part 17 reaches the vicinity of the spark position of the ignition part 17, following the fuel heading directly to the ignition part 17.

The indirect route 29 is designed in various ways to be differentiated from the direct route 27.

More specifically, the indirect route 29 is constructed so as to allow the deflected fuel to smoothly head to the vicinity of the ignition part 17. In this construction, for example, the protrusions 28 are made up of triangular pole-shaped protrusions projecting into the combustion chamber 6, and a pair of elongate side faces 30 is formed on both sides of the passage 25 to expand along both sides of the passage 25. All corners are rounded. The pair of side faces 30 opposed to each other enables the fuel to be easily deflected towards the vicinity of the ignition part 17.

Each of the side faces 30 has a spot shown by a shaded area as illustrated in FIG. 4, which serves as a deflecting section S (shown only one) on which a portion of the fuel impinges to be deflected. As shown in FIG. 4, a gap between the pair of side faces 30 becomes narrower from the injection part 11 towards the ignition part 17 (L1>L2). Fuel jets that have been deflected at the deflecting sections S thus collide with each other between the side faces 30 and head to the ignition part 16. In this way, the fuel jets cancel each other in terms of flow velocity. It is then possible to reduce the gas flow velocity at the time point when the fuel reaches the ignition part 17, to thereby avoid a blow-off of ignition and delay the timing of when the fuel reaches the ignition part 17.

The injection holes 21 are oriented toward the passage 25 and the protrusions 28 so that the fuel is efficiently led to the direct route 27 and the indirect route 29. More concretely, among the plurality of, here five, injection holes 21 angled in the direction of the ignition part 17 as illustrated in FIGS. 2 to 4, an injection hole 21a is positioned in the front of the passage 25 so that the fuel heads directly to the ignition part 17. Especially the injection hole 21a is designed so that the fuel is directly injected towards just above the ignition part 16 (above the tip end of the side electrode 19) to send the fuel to the ignition part 17 quickly.

Among the injection holes 21, two injection holes 21b located on both sides of the ignition hole 21a are arranged at such angles that the fuel is injected to both sides of the passage 25. In order to avoid an influence of orientation of the side electrode 19, the injection holes 21b on both sides of the injection hole 21a are arranged at such angles that the side electrode 19 is not exposed directly to fuel spray in whatever phase the side electrode 19 is stopped. To be more specific, the injection holes 21b on both sides of the injection hole 21a are arranged at such angles that fuel is injected to both sides of the ignition part 17 (see FIG. 6), to thereby prevent the fuel spray from adhering directly to the side electrode 19. Due to this arrangement of the injection holes 21b on both sides, fuel is easily deflected at the deflecting sections S of the passage 25, and moreover, the deflected fuel is smoothly led to the vicinity of the ignition part 17.

The above-described construction of the combustion chamber 6, which includes the routes 27 and 29 of two different kinds, stabilizes combustion during lean-burn operation.

How combustion works during lean-burn operation will be explained below with additional reference to FIGS. 5 to 8. It is assumed that, during the compression stroke of the piston 2, the fuel injection valve 10 is opened for lean-burn operation at part load according to injection time (injection amount) based upon engine operation conditions. The fuel is then injected from the injection holes 21.

Of the fuel injected from the injection holes 21, fuel α that is injected from the injection hole 21a disposed in the front of the passage 25 heads to the direct route 27 as illustrated in FIGS. 2 to 7. In other words, the fuel α is injected directly to the vicinity of the ignition part 17 of the spark plug 15, or more specifically, just above the ignition part 17 (just above the side electrode 19). As the fuel gets close to just above the ignition part 17, an air-fuel mixture suitable for ignition is produced in the vicinity of the ignition part 17 (as a result of vaporization of the fuel).

A portion of fuel β injected from the two injection holes 21b towards both sides of the ignition part 17 heads to the protrusions 28 located on both sides of the passage 25. The fuel β impinges on the protrusions 28. More concretely, the fuel β impinges on the deflecting sections S of the respective side faces 30 as illustrated in FIGS. 2 to 7.

Figure 6:
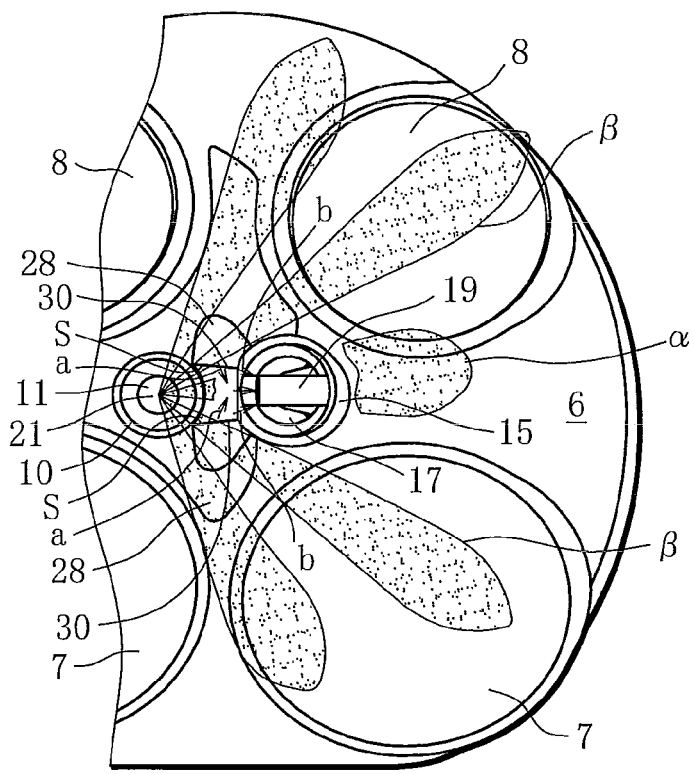
FIG. 6 is a bottom view of FIG. 5.
Figure 7:
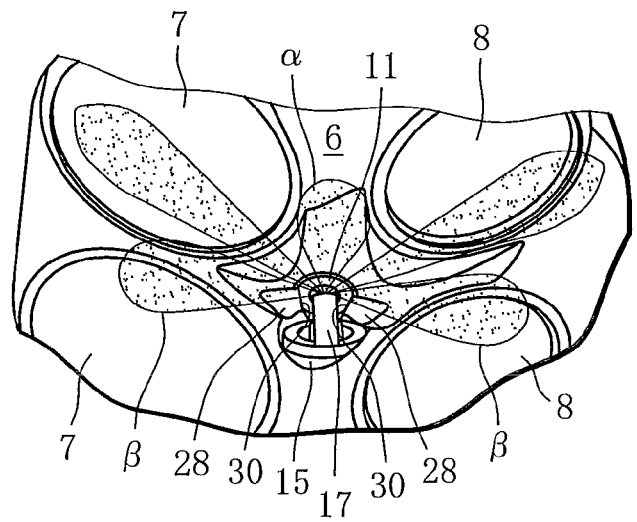
FIG. 7 is a perspective view, as viewed from a different direction from that of FIG. 5.
Figure 8:
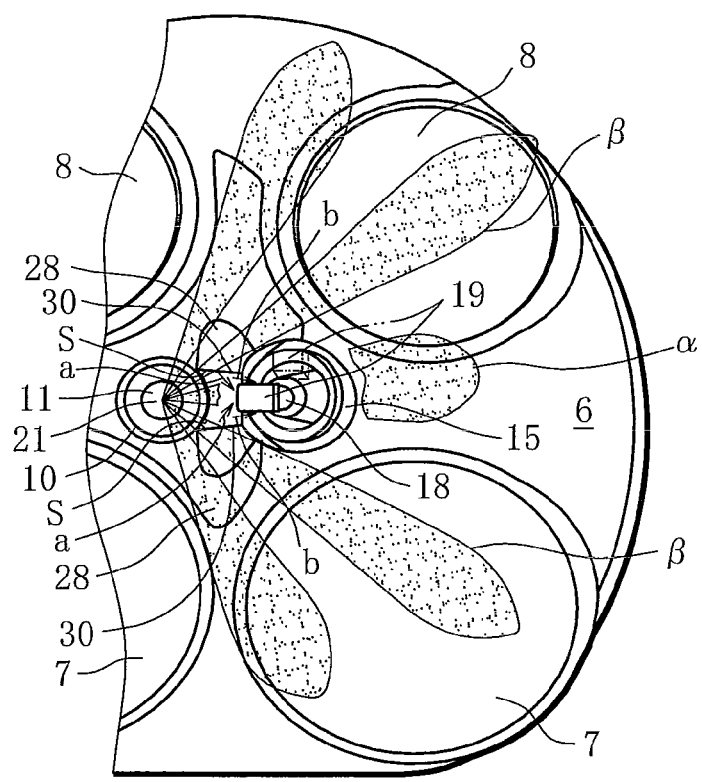
FIG. 8 is a bottom view for explaining the operation when the position of a side electrode of a spark plug is different.

Since the gap between the pair of side faces 30 becomes narrower towards the spark plug 15, the fuel jets, after impinging on the side faces 30, are deflected to between the side faces as shown by arrow a in FIG. 6. Jets of the fuel then collide with each other between the side faces within the recess 26. The collided jets of the fuel β reduced in flow velocity reach the vicinity of the ignition part. In short, the fuel is injected through the indirect route 29 to the vicinity of the ignition part 17.

The fuel passing through the indirect route 29 has a greater route length than the one passing through the precedent direct route 27. In result, the fuel passing through the indirect route 29 reaches the vicinity of the ignition part later than the fuel α passing through the precedent direct route 27. Following the air-fuel mixture produced from the fuel α that is provided through the precedent direct route 27, an air-fuel mixture suitable for ignition keeps being produced from the fuel provided through the indirect route 29 (as a result of fuel vaporization) in the vicinity of the ignition part, that is, in a gap between a central electrode 18 and the side electrode 19.

Consequently, there is a difference in reaching timing between the two different kinds of routes, namely, the direct and indirect routes 27 and 29. Accordingly, even in a short period of time during and immediately after the fuel injection, the air-fuel mixture suitable for ignition can remain in the vicinity of the ignition part for a long time.

The above phenomenon means that an air-fuel mixture area at a theoretical air-fuel ratio remains in the vicinity of the ignition part 17 of the spark plug 15 for a long time while the whole combustion chamber 6 is in an excess-air condition (stratified air-fuel mixture). Additionally, the fuel deflection reduces the gas flow velocity at the time point when the fuel reaches the vicinity of the ignition part.

The air-fuel mixture can be then stably ignited. This enables a stable lean-burn operation using as a source of ignition a relatively rich air-fuel mixture area that is created in the vicinity of the ignition part.

The indirect route 29 may have such a simple construction as the one described above, in which the pair of protrusions 28 is formed on both sides of the passage 25 that leads fuel directly to the ignition part 16 to deflect the fuel at the protrusions 28. Since the fuel is deflected at the pair of side faces 30 expanding along both sides of the passage 25, it is easy to deflect the fuel to the vicinity of the ignition part.

Moreover, since the indirect route 29 includes a construction in which the deflected fuel jets are caused to collide with each other between the side faces, it is possible, with the simple construction, to delay the timing of when the fuel β reaches the vicinity of the ignition part. Particularly if the deflected fuel jets collide with each other, the gas flow velocity at the time point when the fuel reaches the ignition part 17 is reduced. This makes it possible to avoid a blow-off of ignition and to delay the timing of when the fuel reaches the ignition part 17 to a considerable degree. The collided fuel jets reach the vicinity of the ignition part with being diffused. Depending upon a screwed-in state (fitting condition) of the spark plug 15, even if the side electrode 19 is installed on a side blocking the fuel injection (on the injection part 11 side) as shown by a solid line of FIG. 8, or if the side electrode 19 is set in a halfway position as shown by a chain-double dashed line of FIG. 8 (variation in a phase of the side electrode of the ignition part), instead of on the opposite side of the injection part 11 as illustrated in FIGS. 1 to 7, it is possible to produce an air-fuel mixture, which is well suitable for ignition, in the vicinity of the ignition part, regardless of variation in the phase of the side electrode of the ignition part 17, since the fuel is satisfactorily sent to the spark position of the ignition part 17.

The fuel is injected separately to the direct route 27 and the indirect route 29 by using the multi-holes, so that the air-fuel mixture suitable for ignition efficiently remains in the vicinity of the ignition part. Particularly if fuel is injected directly to just above the ignition part 17, the fuel can be sent to the ignition part 17 quickly. In result, a dwell time of the air-fuel mixture suitable for ignition is accordingly increased. Furthermore, the fuel directly injected to the ignition part 17 at this point draws in the fuel indirectly heading towards the ignition part 17. The fuel α heading directly to the ignition 17 thus prevents an excessive diffusion of the fuel β heading indirectly to the ignition part 17. This also allows to keep the air-fuel mixture suitable for ignition in the vicinity of the ignition part for a long time.

It is to be noted that the invention is not limited to the one embodiment described above. Various modifications can be made without deviating from the spirit of the invention.

The invention claimed is:

1. An in-cylinder injection type internal combustion engine comprising:
   a fuel injection valve that includes an injection part located in a combustion chamber of the internal combustion engine and injects fuel from the injection part into the combustion chamber;
   a spark plug that includes an ignition part arranged alongside of and adjacent to the injection part and ignites the fuel injected from the injection part by using the ignition part; and
   a deflecting part that has a passage for directing the fuel, which is injected from the injection part, directly to the vicinity of the ignition part, the passage being located on a wall face of the combustion chamber between the injection part and the ignition part, and the deflecting part deflecting a portion of the fuel injected from the injection part to indirectly direct the portion of the fuel to the vicinity of the ignition part.

2. The in-cylinder injection type internal combustion engine according to claim 1, wherein
   the deflecting part is constructed of a pair of protrusions projecting from both sides of the passage into the combustion chamber.

3. The in-cylinder injection type internal combustion engine according to claim 2, wherein
   the pair of protrusions includes a pair of side faces opposite to each other and expanding along both sides of the passage, and deflects on the side faces a portion of the fuel injected from the injection part.

4. The in-cylinder injection type internal combustion engine according to claim 3, wherein
   the pair of side faces gets closer to each other towards the ignition part, and is arranged so that jets of the fuel collide with each other between the side faces after being deflected and head towards the spark plug.

5. The in-cylinder injection type internal combustion engine according to claim 1, wherein
   the injection part of the fuel injection valve has at least three injection holes;
   one of the injection holes injects fuel heading directly to the vicinity of the ignition part; and
   two other injection holes inject fuel heading to the deflecting part.

6. The in-cylinder injection type internal combustion engine according to claim 2, wherein
   the injection part of the fuel injection valve has at least three injection holes;
   one of the injection holes injects fuel heading directly to the vicinity of the ignition part; and
   two other injection holes inject fuel heading to the deflecting part.

7. The in-cylinder injection type internal combustion engine according to claim 3, wherein
   the injection part of the fuel injection valve has at least three injection holes;
   one of the injection holes injects fuel heading directly to the vicinity of the ignition part; and
   two other injection holes inject fuel heading to the deflecting part.

8. The in-cylinder injection type internal combustion engine according to claim 4, wherein
   the injection part of the fuel injection valve has at least three injection holes;
   one of the injection holes injects fuel heading directly to the vicinity of the ignition part; and
   two other injection holes inject fuel heading to the deflecting part.

* * * * *